UNITED STATES PATENT OFFICE.

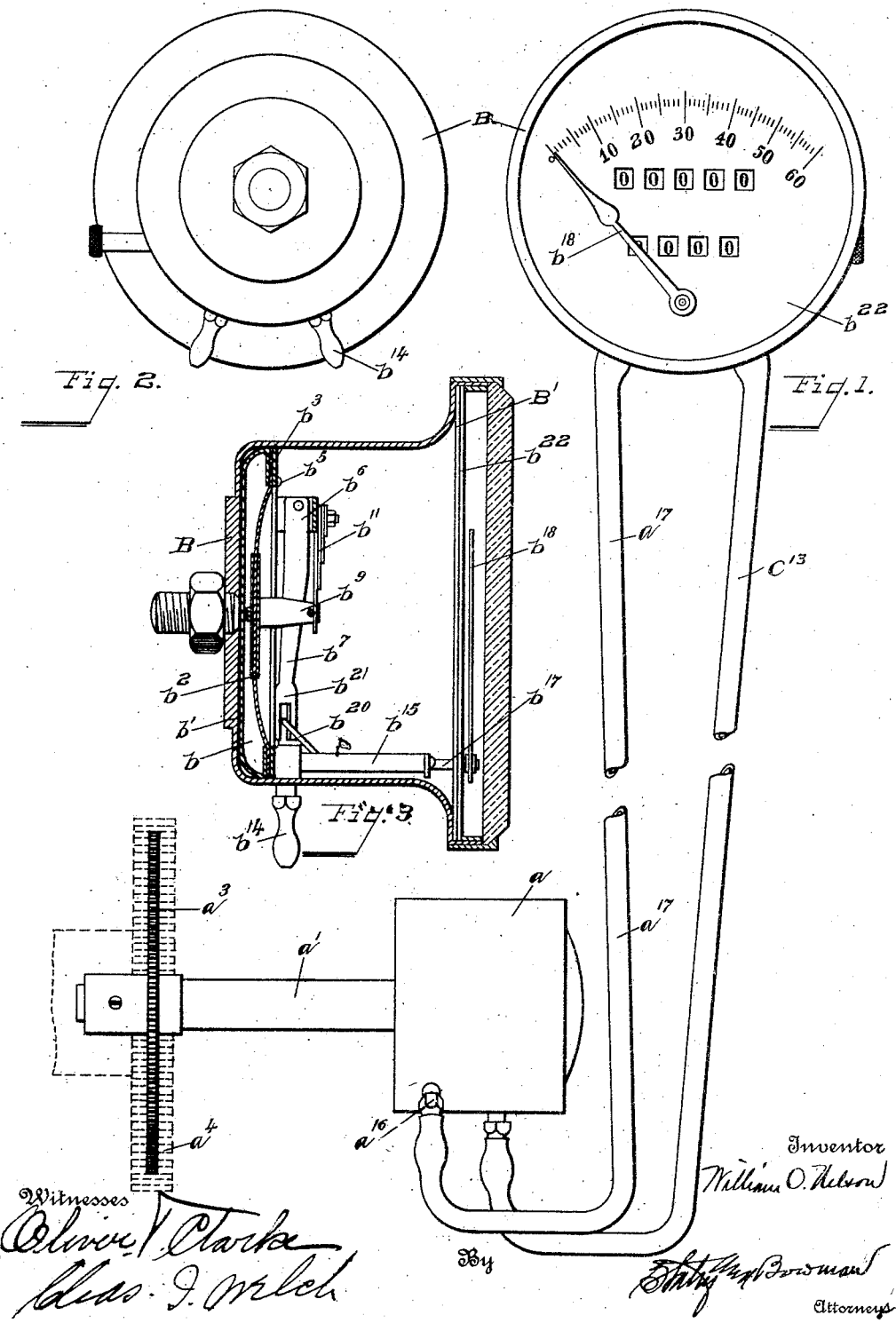

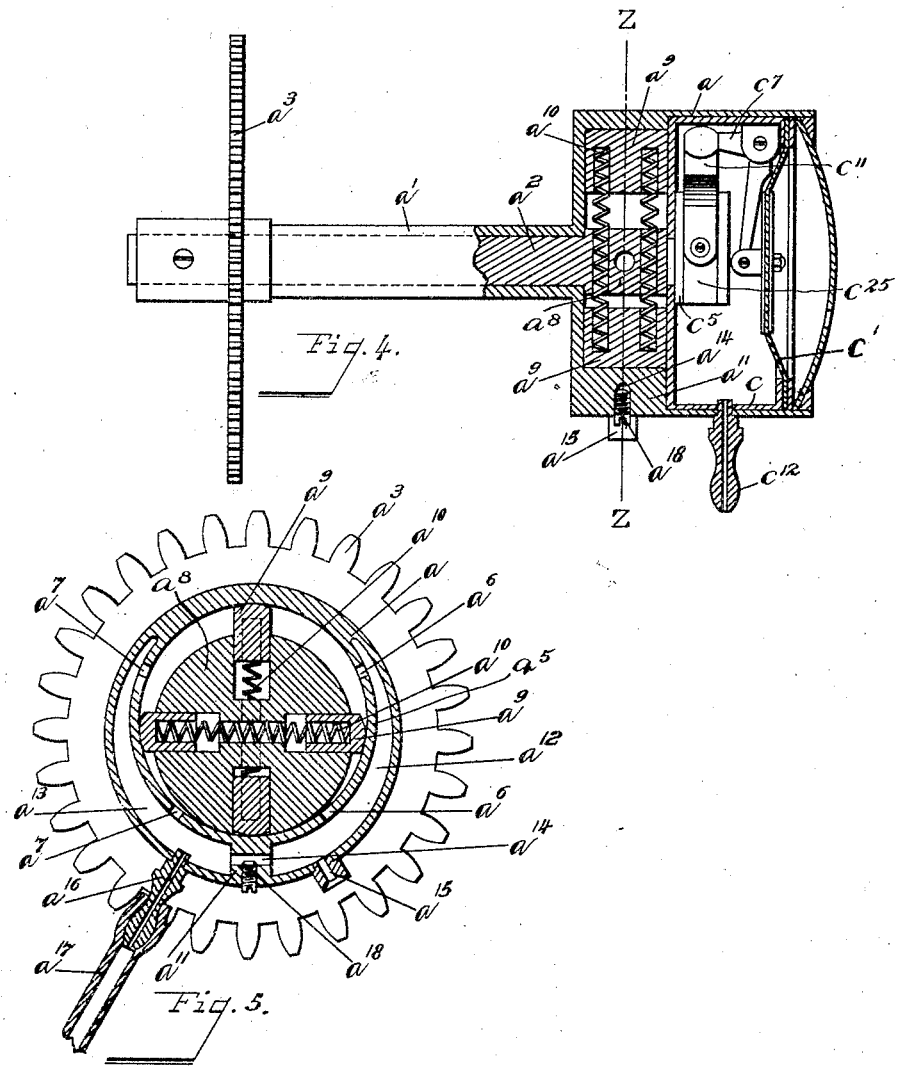

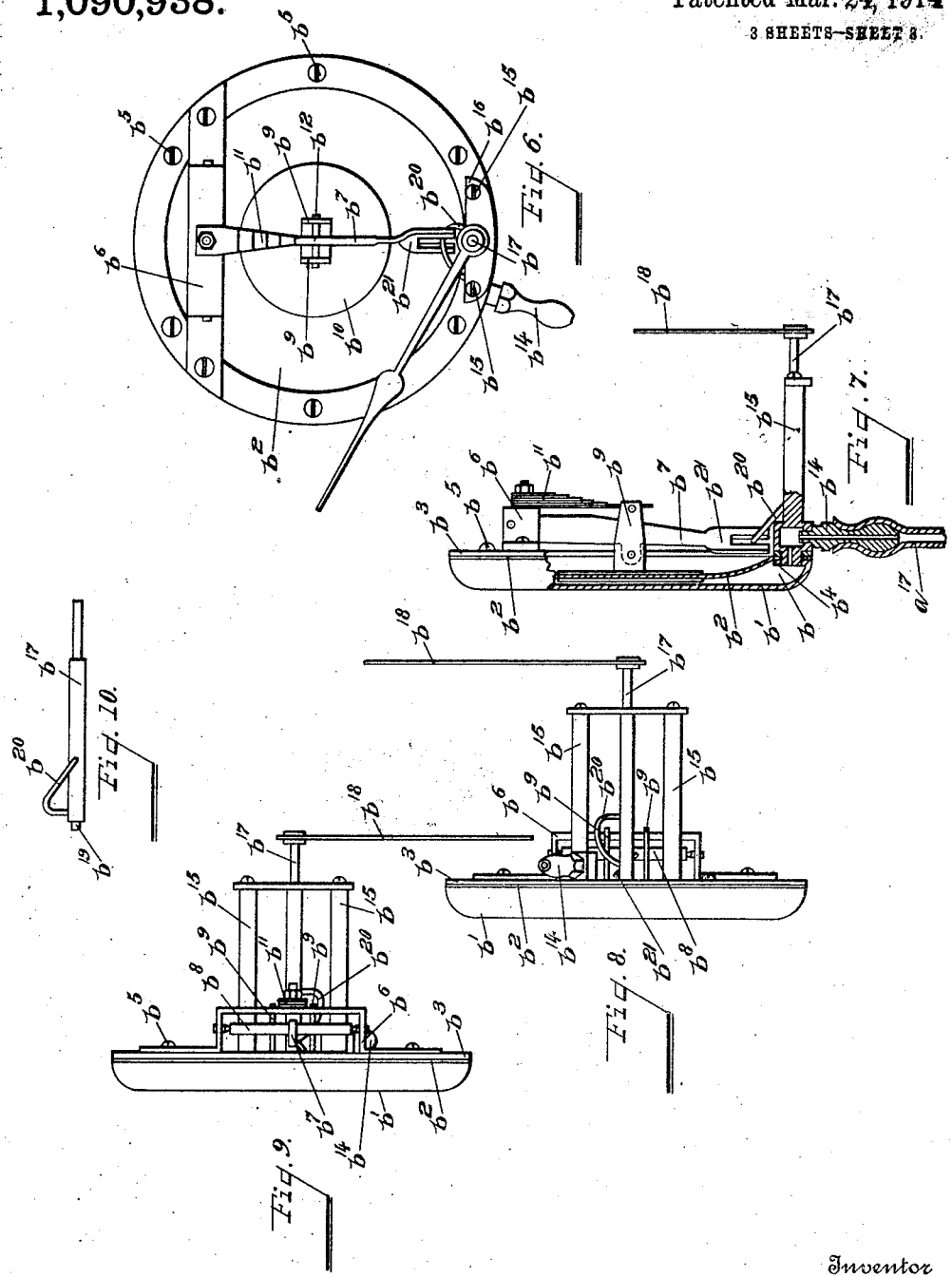

WILLIAM O. NELSON, OF BALTIMORE, MARYLAND.

SPEEDOMETER.

1,090,938.  Specification of Letters Patent.  Patented Mar. 24, 1914.

Original application filed January 26, 1910, Serial No. 540,208. Divided and this application filed June 27, 1910. Serial No. 569,192.

*To all whom it may concern:*

Be it known that I, WILLIAM O. NELSON, a citizen of the United States, residing at Baltimore, State of Maryland, have invented certain new and useful Improvements in Speedometers, of which the following is a specification.

This invention relates to improvements in speedometers for determining the speed of vehicles, the invention relating particularly to improvements upon the devices set forth in my pending application, Ser. No. 485,317, filed March 23, 1909, and being a division of my pending application Ser. No. 540,208, January 26, 1910.

The object of my invention is to improve the construction of devices of this character and to devise an instrument which will be simple in construction, cheap to manufacture and effective and accurate in its operation.

The invention consists in the constructions and combinations of parts hereinafter described and set forth in the claims.

In the accompanying drawings—Figure 1 is a front elevation of a device embodying my invention. Fig. 2 is a rear view of the indicator casing shown in Fig. 1. Fig. 3 is a vertical section through the indicator casing, some of the parts of the registering devices shown and described in my original application referred to being omitted. Fig. 4 is a vertical longitudinal sectional view of the pressure generator. Fig. 5 is a section on the line $z$—$z$ of Fig. 4. Fig. 6 is a front elevation of some of the devices for operating the speed index hand. Fig. 7 is a side elevation of the same parts shown in Fig. 6 with some of the parts broken away and some shown in section. Fig. 8 is a bottom plan view of the same. Fig. 9 is a top plan view of the same. Fig. 10 is a detail of the shaft to which the indicator hand is connected.

Like parts are represented by similar characters of reference in the several views.

As in my prior application referred to, the operating devices for the speed indicator consist of a generator for generating a pressure of air, which generator is driven from any suitable movable part of the vehicle to which the device is applied. The generator employed in this present device is substantially the same as that set forth in the prior application and which will again be briefly described as follows reference being had particularly to Figs. 4 and 5.

*Generator.*—$a$ represents the outer casing of the generator, connected to any suitable point of the vehicle, preferably through the medium of a bearing $a'$. Extending through this bearing is a shaft $a^2$, the outer end of which has connected therewith a gear $a^3$, meshing with the gear $a^4$, fixed to any movable part of the vehicle such as the hub of one of the wheels. Located within the outer casing is a cylinder $a^5$, eccentric to the axis of the said shaft, which cylinder has inlet ports $a^6$, and outlet ports, $a^7$, oppositely arranged. Located within this cylinder is a piston head, $a^8$, secured to the inner end of the shaft so as to be rotated thereby, the periphery of this cylinder head being eccentric to the inner periphery of the cylinder and having a close fit with one side thereof. Located about the cylinder head is a series of piston blades or slides, $a^9$, four being shown in the present instance, located in radial slots in the said head and being spring-pressed outwardly against the walls of the cylinder by means of springs $a^{10}$. The space between the eccentrically arranged cylinder and the outer casing is divided by a partition $a^{11}$ so as to form two chambers $a^{12}$ and $a^{13}$ on opposite sides thereof, this partition having a restricted orifice $a^{14}$ extending therethrough. The chamber $a^{12}$ communicates with the atmosphere through a vent $a^{15}$. A nipple, $a^{16}$ is connected to the casing and communicates with the other chamber $a^{13}$, and a tube $a^{17}$ connects this nipple with the speed indicator to cause the indicator to be operated by the air pressure generated in the manner hereinafter more fully explained. A throttling valve $a^{18}$ is provided in the reduced orifice $a^{14}$ to permit the instrument to be adjusted so that the indicator may properly designate the speed at which the vehicle is moving, this valve being in the nature of a screw tapped into one end of the partition. As the piston head is revolved the air is exhausted from the chamber $a^{12}$ and forced into the chamber $a^{13}$ and thence back again into the chamber $a^{12}$ through the restricted passage. This restricted passage, however, being relatively small, the air will be caused to be compressed more or less in the chamber, $a^{13}$, according to the speed of the vehicle, which pressure will back up through the tube $a^{17}$, to the speed indicator device and operate the said indicator device in the manner now to be described.

*Speedometer.*—Located in one end of the main casing, B, is a chamber $b$, formed by a shallow cup-shaped disk, $b'$, on one side and a flexible diaphragm $b^2$ on the opposite side, this flexible diaphragm being secured to the disk $b'$, by a ring $b^3$; the disk $b'$ having an inwardly extending flange $b^4$ for this purpose and the said ring being secured to said flange, with the edge of the flexible diaphragm clamped between the same, by small screws $b^5$, or other suitable fastening devices. This flexible diaphragm is preferably formed of leather but may be constructed of any suitable material. Pivoted in a suitable support $b^6$, secured to the said chamber is an operating lever $b^7$, this operating lever being pivoted to said support preferably by providing the end of said lever with extending trunnions $b^8$, (see Fig. 8) which trunnions are engaged by set-screws adjustably secured in the sides of said support $b^6$. This lever $b^7$ is pivotally connected midway its length to the center of the diaphragm $b^2$ through the medium of the ears $b^9$, which ears are secured to the diaphragm by being riveted or otherwise fastened thereto; circular disks $b^{10}$ being secured to either side of the diaphragm at the central portion to stiffen the same at this point and provide a better attachment for the ears. A spring $b^{11}$, secured at one end to the support $b^6$ with its free end resting on a small bar $b^{12}$ secured between the ears $b^9$, serves normally to force the diaphragm to collapsed position as shown in Fig. 7. Communicating with the chamber, $b$, is a nipple $b^{14}$ and connected to this nipple is one end of the tube $a^{17}$ previously referred to. Revolubly mounted in a suitable support, consisting of the rods $b^{15}$, and cross-bar $b^{16}$, is a shaft $b^{17}$, to the end of which is secured an indicator pointer $b^{18}$; the other end of the said shaft being formed with a reduced end $b^{19}$ which is seated into a recess or a socket in the ring $b^3$ to provide a bearing for this end of said shaft. Secured to the said shaft is a spiral-shaped projection, $b^{20}$, which is straddled by the bifurcated outer end $b^{21}$ of the said lever $b^7$. The result of this construction is that the air pressure caused by the said generator, entering the chamber, $b$, will force the diaphragm away from the disk $b'$, thereby moving the lever $b^7$ and causing the same to revolve the shaft $b^{15}$ through the medium of the spiral-shaped part $b^{20}$ and thus cause the indicating hand to move about the graduated dial $b^{22}$; the formation of the spiral-shaped projection, $b^{20}$, being such as will impart to said indicating hand a uniform movement thus obviating the necessity of arranging the indications on the dial at varying distances apart. The extent of movements of the parts will depend directly upon the air pressure, which will be regulated by the speed of the vehicle, and the inclination of the spiral-shaped projection, $b^{20}$, gradually decreases in relation to the vertical axes of the index shaft, $b^{17}$ in a direction toward the outer end thereof to compensate for the changes in the relative pressures at variable speeds necessitated by the fact that the pressure of the gas forced through the aperture increases in proportion to the square of the volume of the gas passed through the aperture in a given time.

The parts shown at the right of the piston in Fig. 4 relate to the odometer mechanism and operate quite independently of the speedometer devices described. These parts are located in auxiliary casing $c$ and consists of a flexible diaphragm $c^1$ closing one end of the casing, an eccentric $c^5$ connected with the generator shaft $a^2$, a bell crank lever $c^7$, one arm of which is connected to the center of the diaphragm and the other arm of which is connected by a ball-and-socket joint to the yoke $c^{11}$, which yoke is pivotally connected to a strap $c^{25}$ which encircles the eccentric so as to cause the movement of the eccentric to be imparted to the diaphragm. A nipple $c^{12}$ communicates with interior of the casing and is connected by a pipe connection $c^{13}$ to the main casing B within which may be located suitable mechanism for registering the distance traveled by the vehicle. This mechanism, however, is not shown in the present application, but is fully described in my copending application Ser. No. 540,208.

Having thus described my invention, I claim:

1. In a speedometer for vehicles, a pivoted lever having a bifurcated end, means controlled by the speed of the vehicle for imparting to said lever a movement proportionate to the speed of said vehicle, a rotatable shaft having an indicating hand, and a spiral-shaped projection on said shaft straddled by the bifurcated end of said lever to cause the movement of said lever in either direction to be imparted to said indicating hand.

2. In a speedometer for vehicles, a gas receptacle, a flexible diaphragm connected with said receptacle, means controlled by the motion of the vehicle for creating pressures of gas in said receptacle to impart movements to said diaphragm proportionate to the speed of the vehicle, a lever pivoted at one end, means for connecting said lever with said diaphragm, the other end of said lever being bifurcated, a rotatable shaft carrying an indicating hand, and a spiral-shaped projection on said shaft straddled by the bifurcated end of said lever to cause the movement of said lever in either direction to be imparted to said indicating hand.

3. In a speedometer for vehicles, a fluid receptacle, a movable part connected with said receptacle, means controlled by the speed of said vehicle for generating varying pressures of the fluid contained in said receptacle for imparting movement to said movable part, a pivoted lever having a bifurcated end, means for connecting said lever to said movable part, a rotatable shaft having an indicating hand, and a spiral-shaped projection on said shaft straddled by the bifurcated end of said lever to cause the movement of said lever in either direction to be imparted to said indicating hand, the inclination of said spiral-shaped projection being varied to correspond to the varying pressures created in said receptacle so as to cause a uniform movement of said indicating hand.

4. In a speedometer for vehicles, a pivoted lever, means controlled by the speed of the vehicle for imparting to said lever a movement proportionate to the speed of the vehicle, a rotatable shaft having an indicating hand, and a spiral-shaped projection on said shaft engaged by said lever, the connection between said spiral-shaped projection and lever being such as to cause said lever to impart to said shaft a positive movement in either direction, substantially as and for the purpose specified.

5. In a speedometer for vehicles, a fluid receptacle, a movable part connected to said receptacle, means controlled by the speed of the vehicle for imparting movement to said movable part through the medium of the fluid contained in said receptacle, a pivoted lever, means for connecting said lever with said movable part, a rotatable shaft carrying an indicating hand, and a spiral-shaped projection on said shaft engaged by said lever, substantially as and for the purpose specified.

6. In a speedometer for vehicles, a fluid receptacle, a flexible diaphragm connected with said receptacle, means controlled by the speed of the vehicle for creating a pressure in said receptacle to impart a movement to said diaphragm proportionate to the speed of the vehicle, a spring for normally holding said diaphragm in collapsed position, a pivoted lever together with means connecting the same with said diaphragm, a rotatable shaft carrying an indicating hand, and a spiral-shaped projection on said shaft engaged by the end of said lever, substantially as specified.

7. In a speedometer for vehicles, a diaphragm, a pivoted lever, means for connecting said lever to said diaphragm so that the lever may be controlled thereby, a shaft whose axis is substantially parallel to the direction of movement of the diaphragm, a spiral-shaped projection on said shaft, and a connection between the free end of said lever and said projection to cause the shaft to rotate a uniform distance by a movement of the diaphragm, substantially as specified.

8. In a speedometer for vehicles, a movable part controlled by the speed of the vehicle to move uniform distances by a uniform variation in the speed, a pivoted lever, means for connecting said lever to said movable part, a rotatable shaft having an indicating hand, and a connection between the free end of said lever and said shaft which will impart a uniform movement to said hand by the movement of said movable part, substantially as specified.

9. In a speedometer for vehicles, a fluid receptacle, a movable part connected to said receptacle, means controlled by the speed of the vehicle for generating varying pressures of the fluid contained in said receptacle for imparting movements to said movable part, a pivoted lever, means for connecting said lever to said movable part, a rotatable shaft carrying an indicating hand, and a spiral-shaped projection on said shaft engaged by the free end of said lever, the inclination of said spiral-shaped projection being varied to correspond to the varying pressures created in said receptacle so as to cause a uniform movement of said indicating hand, substantially as specified.

10. In a speedometer for vehicles, a pivoted lever, a fluid receptacle, means controlled by the speed of the vehicle for creating varying pressures of the fluid in said receptacle, means for causing id fluid to impart varying movements to said lever, a rotatable shaft having an indicating hand, a spiral-shaped projection on said shaft engaged by the free end of said lever, the inclination of said spiral-shaped projection being varied to correspond to the varying pressures of said fluid to cause a uniform movement to be imparted to said indicating hand, substantially as specified.

In testimony whereof, I have hereunto set my hand this 14th day of June, 1910.

WILLIAM O. NELSON.

Witnesses:
J. A. HILLEARY, Jr.,
GUSTAV ARLT.